US008798986B2

United States Patent
Clemons et al.

(10) Patent No.: US 8,798,986 B2
(45) Date of Patent: *Aug. 5, 2014

(54) METHOD OF PROVIDING A MULTILINGUAL TRANSLATION DEVICE FOR PORTABLE USE

(71) Applicant: Newtalk, Inc., San Mateo, CA (US)

(72) Inventors: Robert H. Clemons, Mountain House, CA (US); Bruce W. Nash, East Palo Alto, CA (US); Martha P. Robinson, San Antonio, TX (US); Craig A. Robinson, San Antonio, TX (US)

(73) Assignee: NewTalk, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/727,567

(22) Filed: Dec. 26, 2012

(65) Prior Publication Data

US 2013/0117009 A1    May 9, 2013

Related U.S. Application Data

(63) Continuation of application No. 13/525,303, filed on Jun. 16, 2012, now Pat. No. 8,364,466, which is a continuation of application No. 11/717,903, filed on Mar. 13, 2007, now Pat. No. 8,239,184.

(60) Provisional application No. 60/782,810, filed on Mar. 15, 2006, provisional application No. 60/782,060, filed on Mar. 13, 2006.

(51) Int. Cl.
*G06F 17/28* (2006.01)

(52) U.S. Cl.
USPC ............ 704/2; 704/1; 704/7; 704/8; 704/4; 704/3; 704/5; 704/6; 704/277; 434/157; 434/185

(58) Field of Classification Search
CPC ... G06F 17/28; G06F 17/289; G06F 17/2836; G10L 15/265; G09B 19/06
USPC ............ 704/2–6, 8, 258, 277; 434/157, 185
See application file for complete search history.

(56) References Cited

U.S. PATENT DOCUMENTS

RE31,172 E * 3/1983 Nishimura et al. ........... 704/258
4,393,460 A    7/1983 Masuzawa et al.
(Continued)

FOREIGN PATENT DOCUMENTS

GB    2 405 066 A    2/2005
GB    2411 040 A    8/2005
(Continued)

OTHER PUBLICATIONS

Cisco Systems. Echo analysis for voice over IP [IP telephony/voice over IP (VoIP)]. URL: http:www.cisco.com/en/US/docs/ios/solutions_docs/voip_solutions?EA_ISD.html (2011) (downloaded Mar. 16, 2011).

(Continued)

*Primary Examiner* — Lamont Spooner
(74) *Attorney, Agent, or Firm* — Syndicated Law PC; Brian S. Boyer

(57) ABSTRACT

Portable, real time voice translation systems, and associated methods of use, are provided. The systems include a translation system for use on a single unit, portable computing device and operable for accessing a multilanguage database, selecting a source language from a plurality of source languages and a destination language from a plurality of destination languages, inputting a source phrase, transmitting the source phrase to a speech recognition module, a translation engine, and a template look-up engine for finding the phrase template associated with the destination phrase from among the multiple languages. The spoken translation is then output in the selected destination language. The translation system has a total time between the input of the source phrase and output of the destination phrase that is no slower than 0.010 seconds, and a communications interface operable for communicating with a second computer system.

35 Claims, 8 Drawing Sheets

(56) References Cited

U.S. PATENT DOCUMENTS

| | | | |
|---|---|---|---|
| 4,866,755 A | | 9/1989 | Hashimoto |
| 4,882,681 A | * | 11/1989 | Brotz .................................. 704/3 |
| 4,958,366 A | | 9/1990 | Hashimoto |
| 5,503,560 A | * | 4/1996 | Stentiford ...................... 434/167 |
| 5,743,740 A | * | 4/1998 | Visser et al. .................. 434/128 |
| 5,796,916 A | * | 8/1998 | Meredith ...................... 704/258 |
| 5,865,625 A | * | 2/1999 | Baskerville .................. 434/157 |
| 5,946,376 A | | 8/1999 | Cistulli |
| 6,167,287 A | | 12/2000 | Chozui |
| 6,385,586 B1 | * | 5/2002 | Dietz ............................ 704/277 |
| 6,556,972 B1 | * | 4/2003 | Bakis et al. .................. 704/277 |
| 6,622,123 B1 | | 9/2003 | Chanod et al. |
| 6,859,778 B1 | * | 2/2005 | Bakis et al. .................. 704/277 |
| 7,130,790 B1 | * | 10/2006 | Flanagan et al. .................... 704/2 |
| 7,454,340 B2 | * | 11/2008 | Sakai et al. .................. 704/251 |
| 7,455,522 B2 | * | 11/2008 | Polanyi et al. ................ 434/178 |
| 7,711,544 B2 | * | 5/2010 | McEntee et al. .................. 704/4 |
| 8,239,184 B2 | | 8/2012 | Nash |
| 8,364,466 B2 | | 1/2013 | Nash |
| 2001/0034599 A1 | | 10/2001 | Kage et al. |
| 2002/0181669 A1 | | 12/2002 | Takatori et al. |
| 2003/0023424 A1 | | 1/2003 | Weiner |
| 2003/0065504 A1 | | 4/2003 | Kraemer et al. |
| 2003/0125959 A1 | * | 7/2003 | Palmquist ...................... 704/277 |
| 2003/0158722 A1 | | 8/2003 | Lord |
| 2005/0026118 A1 | | 2/2005 | Chen et al. |
| 2005/0261890 A1 | | 11/2005 | Robinson |

FOREIGN PATENT DOCUMENTS

| | | |
|---|---|---|
| JP | 200105199 | 8/1999 |
| JP | 03104432 | 9/1999 |
| JP | 2001251429 | 3/2000 |
| JP | 2003115942 | 10/2001 |
| JP | 2003143299 | 10/2001 |
| WO | WO2007/120418 | 10/2007 |

OTHER PUBLICATIONS

Stone, M. A. et al. Tolerable hearing aid delays. I. Estimation of limits imposed by the Auditory path alone using simulated hearing losses. Ear hear 20(3): 182-92 (Jun. 1999). Abstract.

International search report for WO2007/120418, Oct. 25, 2007, Nextwire systems, Inc.

* cited by examiner

METHOD OF PROVIDING A MULTILINGUAL TRANSLATION DEVICE FOR PORTABLE USE

CROSS-REFERENCE TO RELATED APPLICATIONS

This application is a continuation of U.S. application Ser. No. 13/525,303, filed on Jun. 16, 2012, which is a continuation of U.S. application Ser. No. 11/717,903, filed on Mar. 13, 2007, now U.S. Pat. No. 8,239,184, which claims the benefit of U.S. Provisional Application No. 60/782,810, filed Mar. 15, 2006, and U.S. Provisional Application No. 60/782,060, filed Mar. 13, 2006; wherein, each of the references is hereby incorporated herein by reference in its entirety.

BACKGROUND

1. Field of the Invention

Portable, real time voice translation systems are provided, the systems including a translation system for use on a single unit, portable computing device.

2. Description of the State-of-the-Art

The need for multilingual communication increases daily. Individuals, schools, businesses, and travelers increasingly face situations in which they require flexible and reliable language learning solutions and language translation products. For example, between 1990 and 2000, the population in the United States that speaks a language other than English at home increased by almost 50 percent. And, from an international perspective, increased globalization is driving similar demand for multilingual communication.

Powerful market forces underpin the increasing demand for multilingual language learning solutions in education, travel and leisure, training, and entertainment. As of the U.S. Census 2000, at least 15 percent of the population speaks a language other than English at home in 15 states. This "15/15" demographic likely will grow to "20/20" in the near term given the continuing rapid growth in the Spanish-speaking population in the United States. The annual market potential for language learning solutions, considering only these focal states is approximately $700M, which is a strong indicator of the need for innovations in this market that replenishes each year with the prevailing school-year calendars.

The No Child Left Behind Act of 2001 (NCLB) provides additional, federally-mandated impetus for more effective language learning solutions. NCLB requires states to test children in reading and math every year in grades 3 through 8. Under NCLB, schools and districts also are now accountable for helping students with limited English proficiency meet the same challenging academic content and achievement standards all children are required to meet. The NCLB requirements and objectives therefore result in a much higher level of visibility and accountability for language learning, compared to historical norms.

Rapidly changing demographics, NCLB, and the unquestionably high valuation of language acquisition lead to a strong confluence of market pressure for viable language learning solutions. In this environment, a significant problem arises because existing monolingual solutions are force-fit into multilingual markets.

Existing systems and methods of language learning suffer in that they present only one language at a time, and to use the products effectively, the users must be able to read and/or write. The existing systems and methods do not relate the spoken word to the written word, and are not fully aligned with curriculum standards. Some of the existing methods and systems are high-end electronics that are to complex and costly for many users.

One of skill in the art of teaching will appreciate multilingual language learning solutions that incorporate the key elements missing from existing monolingual language learning tools. Such a solution will include a flexible integration of multiple languages; involve speech recognition and syntheses to make them engaging for a user in the study of multilingual capabilities; adhere to the necessary student curriculum guidelines; provide a relationship between properly spelled written translations and properly pronounced spoken translations through speech recognition, translation, and coding technologies; and, will be conducive to language learning, even if the user cannot read or write. Moreover, such a solution will be especially engaging to users from the very young to the very old, and from the healthy to the infirm, through its appearance, functionalities, ease of use without supervision, and voice coding features.

SUMMARY

Portable, real time voice translation systems are provided, the systems including a translation system for use on a single unit, portable computing device and, in some embodiments, having a total time between the input of the source phrase and output of the destination phrase that is no slower than 0.010 seconds, and a communications interface operable for communicating with a second computer system.

In some embodiments, the system includes a microphone for receiving sound input from a user, wherein, in operation, a portion of the sound input is associated with a spoken source phrase in a source language selected from multiple languages. The system includes a multilanguage database that stores a plurality of phrase templates associated with a respective plurality of phrases. A speech recognition module is also included and is used for converting the spoken source phrase into a recognized source phrase. The system includes a translation engine for translating the recognized source phrase in the selected source language into a destination phrase in a destination language selected from multiple languages, wherein the plurality of phrases in the multilanguage database include the destination phrase. A template look-up engine is included for finding the phrase template associated with the destination phrase from among the multiple languages, and a parameterization module is also included for deriving parameters from the sound input and applying the parameters to the phrase template associated with the destination phrase. Finally, the system includes a speaker for outputting the parameterized destination phrase template to the user as a spoken translation in the selected destination language.

In some embodiments, the system includes a state selector selected from a group consisting of vocabulary content, source language options, destination language options, numeric skills options, translation output pace, automatic mode, interactive mode, and microphone on/off. In some embodiments, the system includes a state selector for facilitating selection of a category associated with a plurality of source phrases, wherein the source phrases are stored in the memory of the system, and one of the source phrases is translated into a destination phrase, wherein both the plurality of source phrases and the destination phrase are in languages selected from multiple languages.

The system can sequentially translate a series of spoken source phrases to provide a real-time translation in the form of a series of spoken destination phrases in the language selected from multiple languages in some embodiments. In some embodiments, the time between the input and output of the source phrase in the speech recognition module is no slower that about 2 milliseconds, in the voice coding module is no slower than 3 milliseconds, in the translation engine is no slower than about 2 milliseconds, and in the parameterization module is no slower than about 3 milliseconds, such that the total time between the input of the source phrase and output of the destination phrase is no slower than about 0.010 second.

The system can translate source phrases to multiple destination languages in a sequential, simultaneous, or overlapping manner and, in some embodiments, can capture speech parameters of the users voice, apply the captured speech parameters to the phrase template associated with the destination language, and use the result to mimic the user's voice. The captured speech parameters can include the pitch, cadence, and tone of the users voice.

The system can also include a display to show a written form of the source phrase, a written form of the destination phrase, or both for the user to relate the spoken phrase to the written phrase. In some embodiments, the system includes a calculation module and the numeric skills options include sequential counting, skip counting, addition, subtraction, multiplication, and division in the language selected from multiple languages.

The system can include a portable, single-unit device, that is (i) designed for use by children of pre-school or elementary school age and (ii) adheres to United States national curriculum guidelines by including a combination of teachings comprising math, science, and social studies.

In some embodiments, the invention is a method of teaching language or numeric skills in multiple spoken languages using the systems taught herein. The method can include setting operational states of the system, wherein the setting includes setting the source language and the destination language, and optionally includes setting a vocabulary database, numeric options, an output pace, automatic mode, interactive mode, or microphone on/off; providing the source phrase to the translation engine; and outputting the spoken translation to teach language or numeric skills in the language selected from the multiple languages by a user.

These features and more will become apparent to one of skill upon obtaining an understanding of the teachings provided herein.

BRIEF DESCRIPTION OF THE FIGURES

FIGS. 8a and 8b illustrate the front and back of a device for children that is designed only for sequential counting or skip counting in multiple languages according to some embodiments.

DETAILED DESCRIPTION

Portable, real time voice translation systems are provided, the systems including a translation system for use on a single unit, portable computing device and, in some embodiments, having a total time between the input of the source phrase and output of the destination phrase that is no slower than 0.010 seconds, and a communications interface operable for communicating with a second computer system. The teachings include a system and method for multilingual teaching of numeric or language skills through an electronic translation of a source phrase to a destination language selected from multiple languages. The electronic translation can occur as a spoken translation, can be in real-time, and can mimic the voice of the user of the system. A "phrase" as used herein is an expression consisting of one or more words, such that the term "word" and "phrase" can be used interchangeably in some embodiments.

Figure 1:
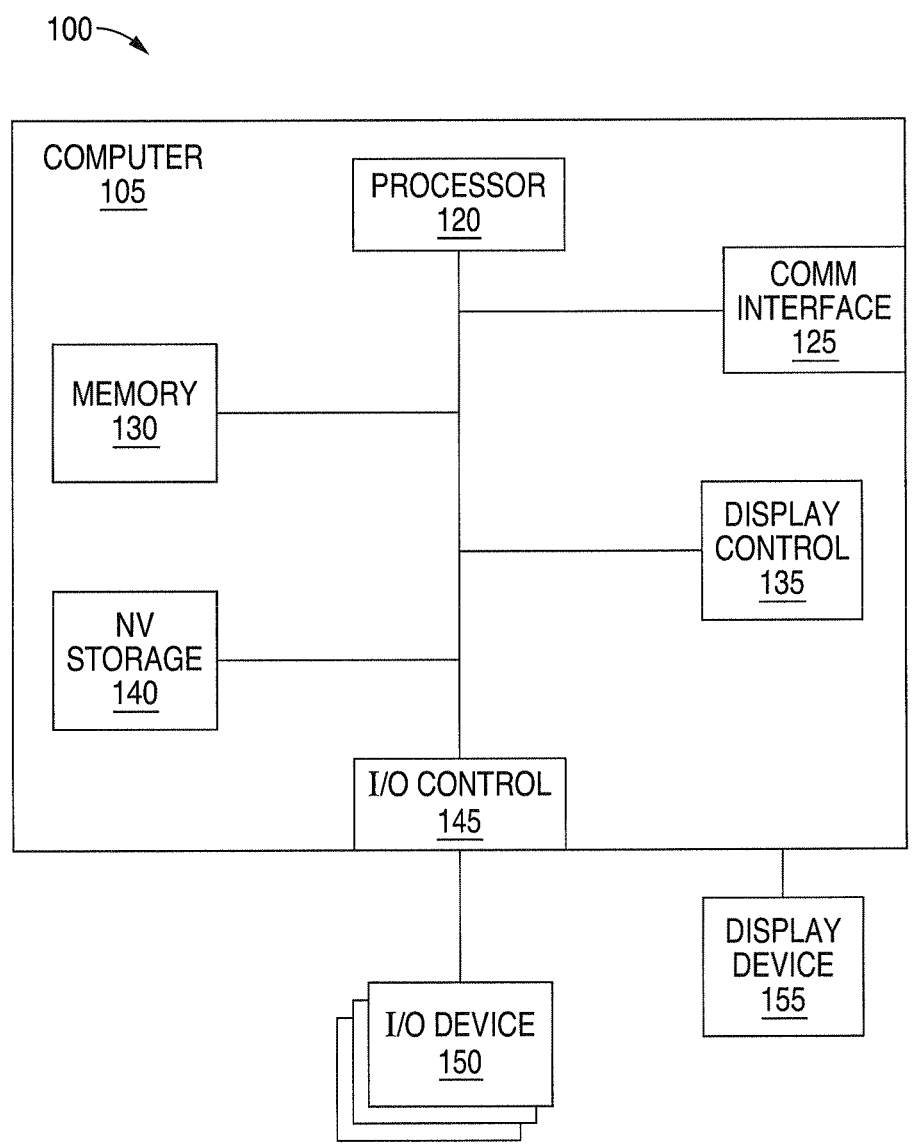
FIG. 1 depicts the general technology platform of a device containing the computer system for a multilingual teaching of numeric or language skills according to some embodiments.

FIG. 1 depicts the general technology platform of a device containing the computer system for a multilingual teaching of numeric or language skills according to some embodiments. The computer system 100 may be a conventional computer system and includes a computer 105, I/O devices 110, and a display device 115. The computer 105 can include a processor 120, a communications interface 125, memory 130, display controller 135, non-volatile storage 140, and I/O controller 145. The computer system 100 may be coupled to or include the I/O devices 150 and display device 155.

The computer 105 interfaces to external systems through the communications interface 125, which may include a modem or network interface. It will be appreciated that the communications interface 125 can be considered to be part of the computer system 100 or a part of the computer 105. The communications interface 125 can be an analog modem, isdn modem, cable modem, token ring interface, satellite transmission interface (e.g. "direct PC"), or other interfaces for coupling the computer system 100 to other computer systems.

The processor 120 may be, for example, a conventional microprocessor such as an Intel Pentium microprocessor or Motorola power PC microprocessor. The memory 130 is coupled to the processor 120 by a bus. The memory 130 can be dynamic random access memory (DRAM) and can also include static ram (SRAM). The bus couples the processor 120 to the memory 130, also to the non-volatile storage 140, to the display controller 135, and to the I/O controller 145.

The I/O devices 150 can include a keyboard, disk drives, printers, a scanner, and other input and output devices, including a mouse or other pointing device. The display controller 136 may control in the conventional manner a display on the display device 155, which can be, for example, a cathode ray tube (CRT) or liquid crystal display (LCD). The display controller 135 and the I/O controller 145 can be implemented with conventional well known technology.

The non-volatile storage 140 is often a magnetic hard disk, an optical disk, or another form of storage for large amounts of data. Some of this data is often written, by a direct memory access process, into memory 130 during execution of software in the computer 105. One of skill in the art will immediately recognize that the terms "machine-readable medium" or "computer-readable medium" includes any type of storage device that is accessible by the processor 120 and also encompasses a carrier wave that encodes a data signal.

Objects, methods, inline caches, cache states and other object-oriented components may be stored in the non-volatile storage 140, or written into memory 130 during execution of, for example, an object-oriented software program.

The computer system 100 is one example of many possible computer systems which have different architectures. For example, personal computers based on an Intel microprocessor often have multiple buses, one of which can be an I/O bus for the peripherals and one that directly connects the processor 120 and the memory 130 (often referred to as a memory bus). The buses are connected together through bridge components that perform any necessary translation due to differing bus protocols.

Network computers are another type of computer system that can be used. Network computers do not usually include a hard disk or other mass storage, and the executable programs are loaded from a network connection into the memory 130 for execution by the processor 120. A Web TV system, which is known in the art, is also considered to be a computer system according to the present invention, but it may lack some of the features shown in FIG. 1, such as certain input or output devices. A typical computer system will usually include at least a processor, memory, and a bus coupling the memory to the processor.

In addition, the computer system 100 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 140 and causes the processor 120 to execute the various acts required by the operating system to input and output data and to store data in memory, including storing files on the non-volatile storage 140.

Figure 2:
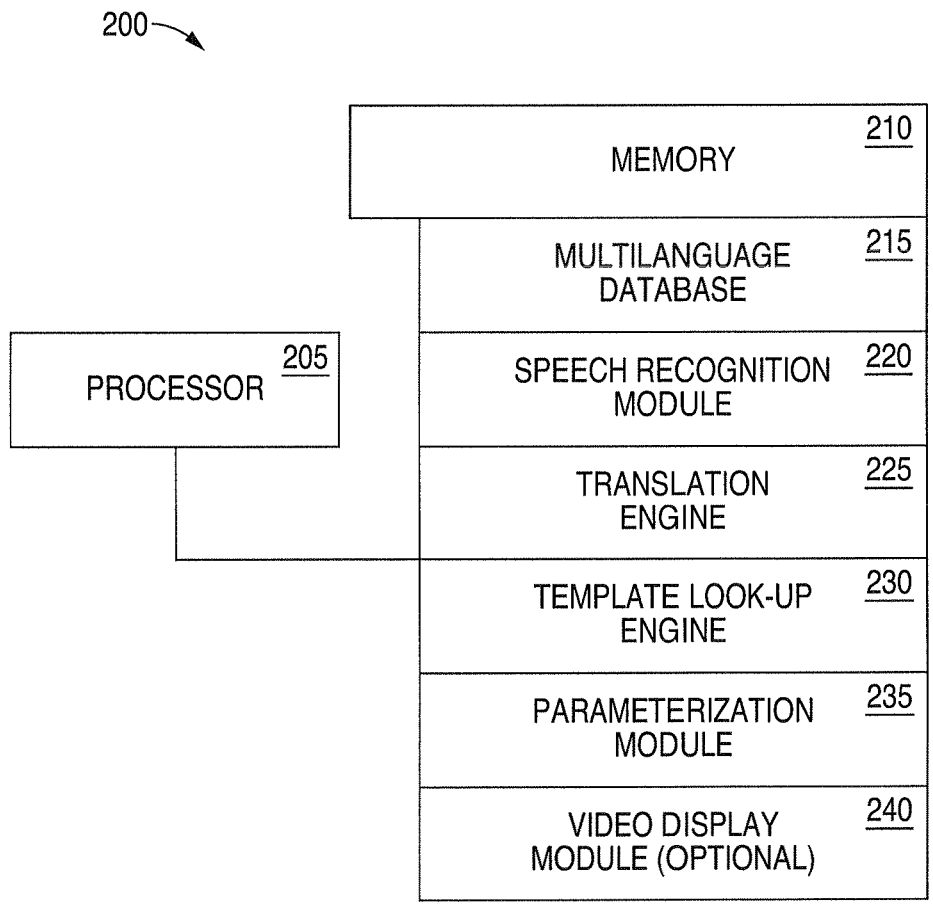
FIG. 2 illustrates a processor-memory diagram to describe the major memory modules processed according to some embodiments.

FIG. 2 illustrates a processor-memory diagram to describe the major memory modules processed according to some embodiments. The system 200 shown in FIG. 2 contains a processor 205 and a memory 210 (that can include non-volatile memory) includes a multilanguage database 215 embodied in a computer readable medium including a plurality of phrase templates associated with a respective plurality of phrases. The memory 210 also contains a speech recognition module 220 embodied in a computer readable medium for converting the spoken source phrase into a recognized source phrase, as well as a translation engine 225 embodied in a computer readable medium for translating the recognized source phrase in the selected source language into a destination phrase in a destination language selected from multiple languages, wherein the plurality of phrases in the multilanguage database 215 include the destination phrase. A template look-up engine 230 embodied in a computer readable medium is included for finding the phrase template associated with the destination phrase from among the multiple languages. And, a parameterization module 235 embodied in a computer readable medium is included for deriving parameters from the sound input and applying the parameters to the phrase template associated with the destination phrase. Optionally, the system includes a video display module 240 to show a written form of the source phrase, a written form of the destination phrase, or both for the user to relate the spoken phrase to the written phrase.

The systems taught herein can store any known language or combination of languages in the multilanguage database 215. For example, the following languages can be programmed into the systems: French (currently about 129 million speakers), Malay-Indonesian (currently about 159 million speakers), Portuguese (currently about 191 million speakers), Bengali (currently about 211 million speakers), Arabic (currently about 246 million speakers), Russian (currently about 277 million speakers), Spanish (currently about 392 million speakers), Hindustani (currently about 497 million speakers), English (currently about 508 million speakers), and Mandarin (currently the most popular with about 1 billion+speakers).

In some embodiments, the multilanguage database includes at least three languages. In these embodiments, the at least three languages are English, French, and Spanish; English, Japanese, and Mandarin; English, French, and Portuguese; English, Russian, and Mandarin; English, Hindustani, and Japanese; English, Arabic, and Russian; or any combination desired by the user.

In some embodiments, the systems taught herein accept input speech, perform voice coding, perform speech recognition, display text, obtain a translation, display error indicators, synthesis speech features, display the translation, and speak the translation. In some embodiments, the systems can operate in an interactive mode or an automatic mode. When operating in an automatic mode the input microphone is disabled.

Figure 3:
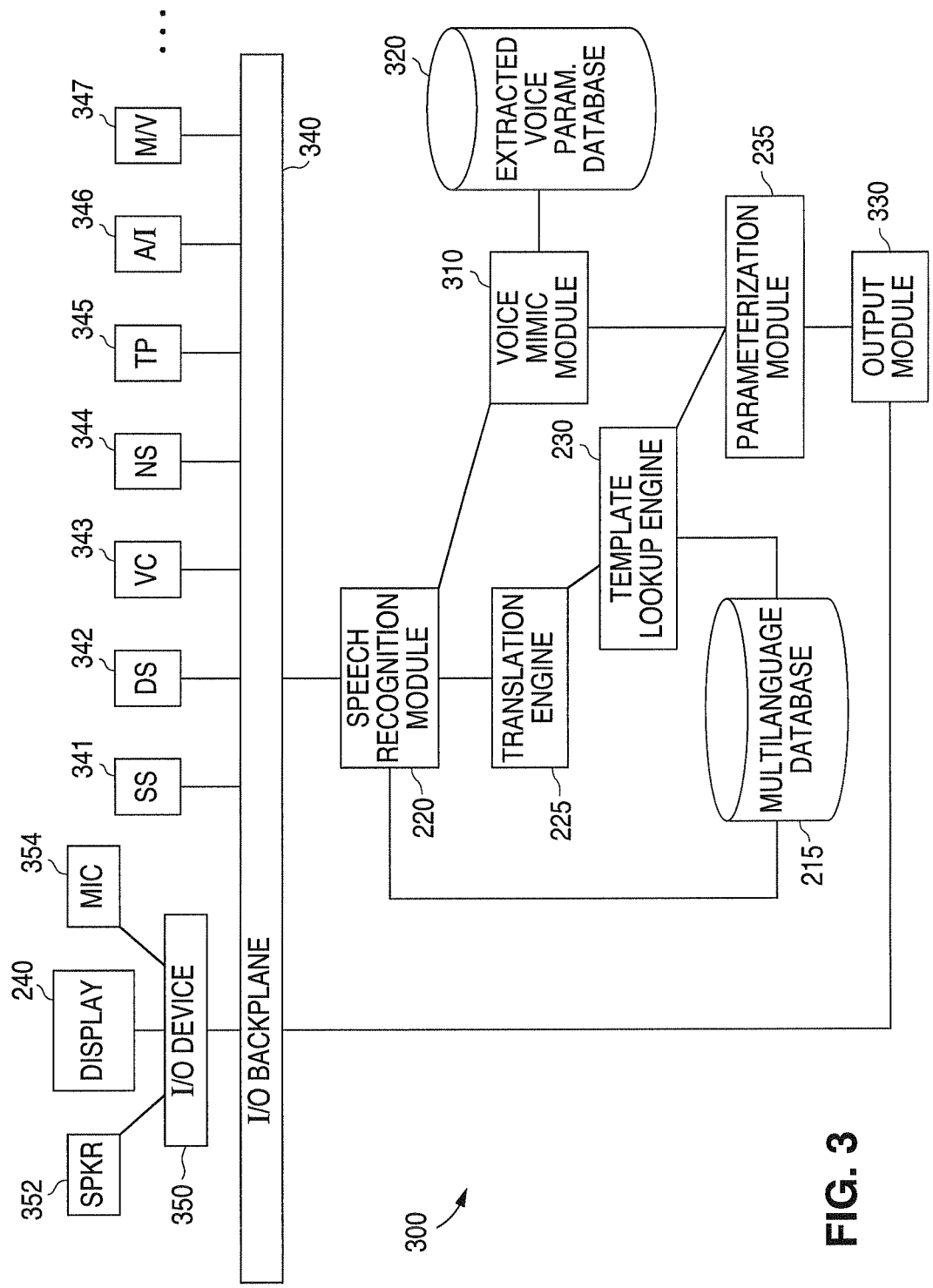
FIG. 3 is a concept diagram illustrating a device containing the computer system for a multilingual teaching of numeric or language skills according to some embodiments.

FIG. 3 is a concept diagram illustrating a device containing the computer system for a multilingual teaching of numeric or language skills according to some embodiments. The device 300 in FIG. 3 contains components that can be used in a typical embodiment. In addition to the multilanguage database 215, the speech recognition module 220, the translation engine 225, the template look-up engine 230, the parameterization module 235, and the video display module (display) 240 shown in FIG. 2, the memory 210 of the device 300 also includes a voice mimic module 310 within the parameterization module 235 to capture the speech parameters of a users voice and use the captured speech parameters to modify the destination phrase to mimic the users voice, and in some embodiments, this feature is optional. The captured speech parameters are stored for use in an extracted voice parameter database 320. In some embodiments, the captured speech parameters include the pitch, cadence, and tone of the users voice. The device 300 includes an output module 330 for outputting the destination phrase to the user.

The systems described herein have real-time translation capabilities. For the purposes of the present teaching, a real-time system is one in which the correctness of the computations not only depends upon the logical correctness of the computation but also upon the time at which the result is produced. If the timing constraints of the system are not met, system failure is said to have occurred. A good example of a real-time application is a robot that has to pick up something from a conveyor belt. The piece is moving, and the robot has a small window to pick up the object. If the robot is late, the piece won't be there anymore, and thus the job will have been done incorrectly, even though the robot went to the right place. If the robot is early, the piece won't be there yet, and the robot may block it. Another example is the servo loops in an airplane when on auto-pilot. The sensors of the plane must continuously supply the control computer with proper measurements. If a measurement is missed, the performance of the airplane can degrade, sometimes to unacceptable levels. Accordingly, the translation system of the systems described herein continuously supply phrase translations at the proper rate and time, thus meeting the timing constraints of the system.

In some embodiments, the translation is real-time as long as the input of the source phrase to be translated aligns with the output of the destination phrase to produce an accurate and understandable translation at a rate that is substantially similar to the rate that the source phrase is input by a user. In some embodiments, the translation is real-time as long as the output of the destination phrase occurs as an accurate and understandable translation at a rate that is substantially similar to the rate that the source phrase is input by a user within time ranging from about 10 milliseconds to about 10 seconds, from about 0.01 second to about 5 seconds, from about 0.01 second to about 2 seconds, from about 0.01 second to about 1 second, from about 0.01 second to about 0.1 second, or any range therein. The slower time frames, for example, exceeding about 5 seconds, may find usefulness in some embodiments where the user needs more mental processing time of the ideas, such as where the user is suffering a pathological condition that affects mental processes.

The system can sequentially translate a series of spoken source phrases to provide a real-time translation in the form of a series of spoken destination phrases in the language selected from multiple languages in some embodiments. In some embodiments, the time between the input and output of the source phrase in the speech recognition module is no slower that about 2 milliseconds, in the voice coding module is no slower than 3 milliseconds, in the translation engine is no slower than about 2 milliseconds, and in the parameterization module is no slower than about 3 milliseconds, such that the total time between the input of the source phrase and output of the destination phrase is no slower than about 0.010 second.

The system can translate source phrases to multiple destination languages in a sequential, simultaneous, or overlapping manner and, in some embodiments, can capture speech parameters of the users voice, apply the captured speech parameters to the phrase template associated with the destination language, and use the result to mimic the user's voice. The captured speech parameters can include the pitch, cadence, and tone of the users voice.

The system can also include a display to show a written form of the source phrase, a written form of the destination phrase, or both for the user to relate the spoken phrase to the written phrase. In some embodiments, the system includes a calculation module and the numeric skills options include sequential counting, skip counting, addition, subtraction, multiplication, and division in the language selected from multiple languages.

The system can include a portable, single-unit device that is (i) designed for use by children of pre-school or elementary school age and (ii) adheres to United States national curriculum guidelines by including a combination of teachings comprising math, science, and social studies. In addition, the written displays provided by the system are in conformance with the letter formation guidelines.

In some embodiments, the invention is a method of teaching language or numeric skills in multiple spoken languages using the systems taught herein. The method can include setting operational states of the system, wherein the setting includes setting the source language and the destination language, and optionally includes setting a vocabulary database, numeric options, an output pace, automatic mode, interactive mode, or microphone on/off; providing the source phrase to the translation engine; and outputting the spoken translation to teach language or numeric skills in the language selected from the multiple languages by a user.

The input and output of the device 300 is connected to an I/O backplane 340, which can be connected to input and output devices through an I/O device 350 or directly. In FIG. 3, the I/O device 350 connects to the speaker (spkr) 352, display 240, and microphone (mic) 354. The source language state selector (ss) 341, the destination language state selector (ds) 342, the vocabulary content state selector (vc) 343, the numeric state selector (ns) 344, the translation pace state selector (tp) 345, the automatic operation/interactive operation state selector (a/i) 346, and the mute/volume state selector (m/v) 347 are connected directly to the I/O backplane 340. Other features can be added such as, for example, an on/off button, a start button, a speech recognition indicator, an ear phone input, and the like. In some embodiments, the system can turn on and off through motion. In some embodiments, the system can have a state selector to select a particular user's voice, such as the mother, father, brother, sister, or even a favorite or respected teacher of the child. In some embodiments, the system can have a state selector to select a preprogrammed voice that is pleasing to the user, such as a voice that would make a child think of a bear, a kitten, a monkey, a puppy, a mouse, and the like.

Figure 4:
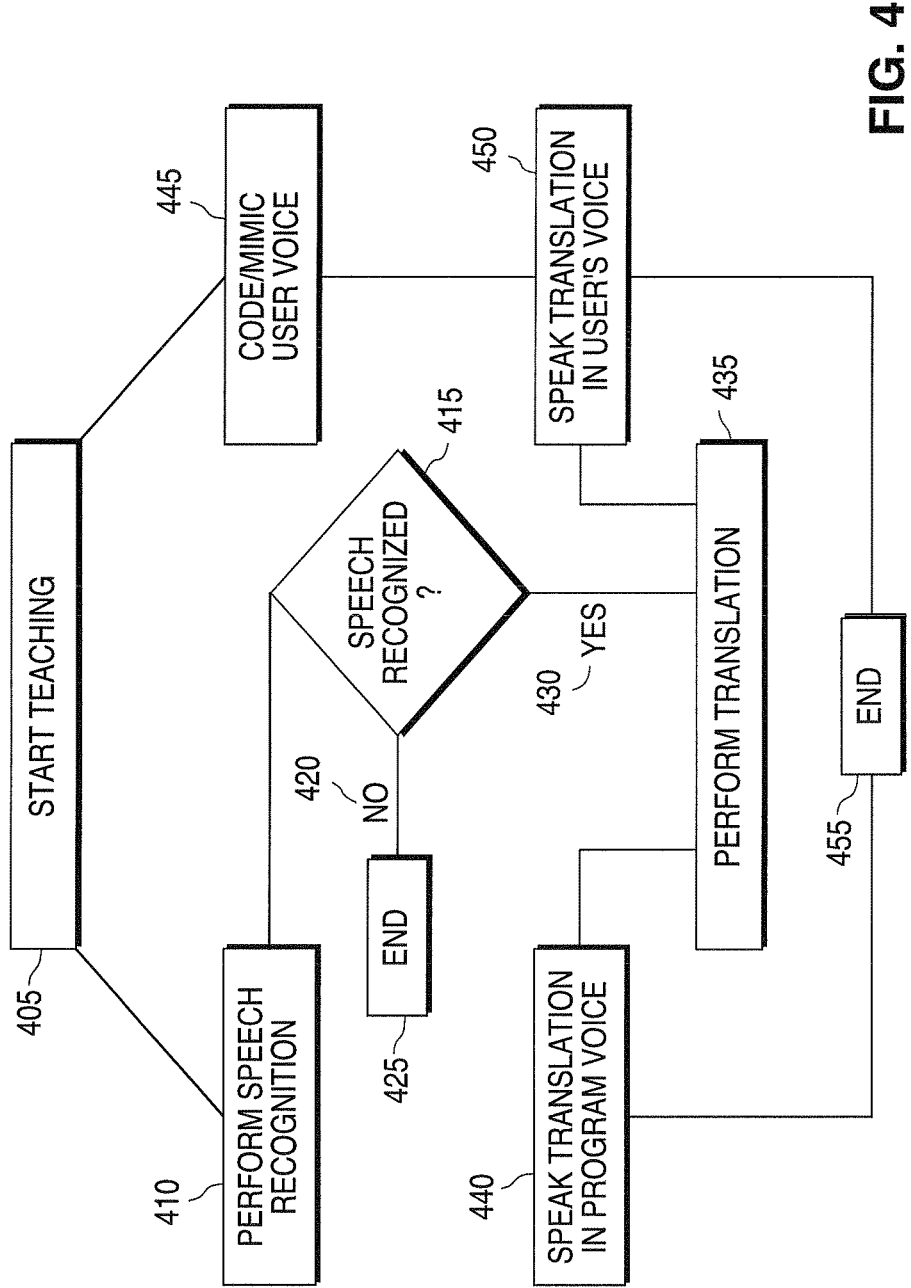
FIG. 4 is a diagram of the logic of the system for a multilingual teaching of numeric or language skills according to some embodiments.

FIG. 4 is a diagram of the logic of the system for a multilingual teaching of numeric or language skills according to some embodiments. The system will start teaching 405 by performing speech recognition 410 on a source phrase that is spoken by a user or provided by a teaching program in the system. The system will then determine whether the speech is recognized 415. If the speech is not recognized 420, then the teaching will end 425. If the speech is recognized 430, then the system will perform a translation 435 on the recognized source phrase. In some embodiments, the translation will be spoken using a voice programmed into the system 440. In some embodiments, the system will obtain speech parameters from the user's voice and code/mimic 445 the user's voice in order to speak the translation in the user's voice 450, after which the teaching will end 455. The voice coding/mimic 445 can occur simultaneous, sequentially, or in an overlapping manner with each phrase and with the other operations.

Figure 5:
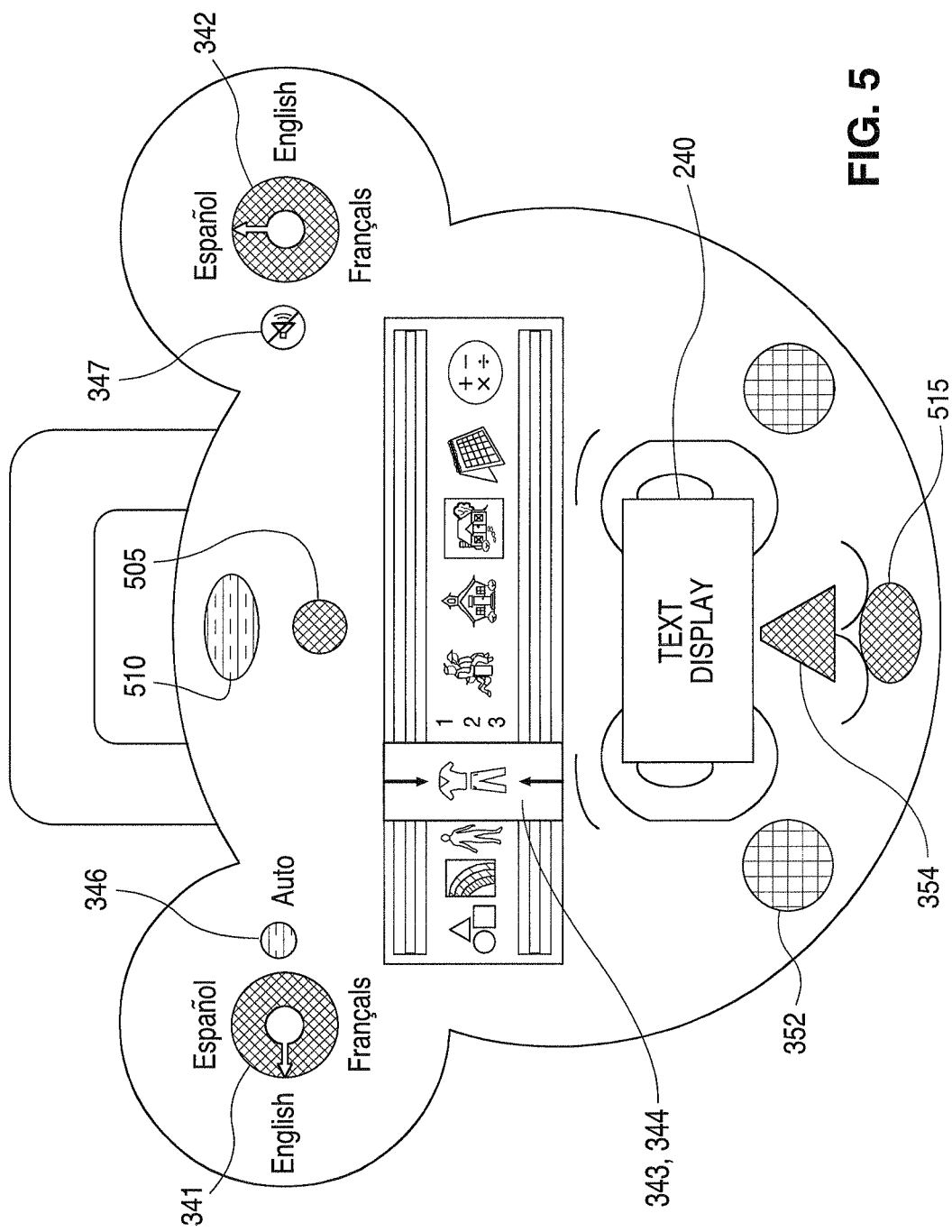
FIG. 5 shows the appearance of a device that can incorporate the system for a multilingual teaching of numeric or language skills according to some embodiments.

FIG. 5 shows the appearance of a device that can incorporate the system for a multilingual teaching of numeric or language skills according to some embodiments. The device 500 can be in a form that is appealing and easy to use by a child in order to help engage the child in the learning process. Device 500 has the shape of a bear, and the source language state selector (ss) 341, the destination language state selector (ds) 342, the automatic operation/interactive operation state selector (a/i) 346, and the mute/volume state selector (m/v) 347 are positioned on the bear's left and right ears, respectively. The vocabulary content state selector (vc) 343, the numeric state selector (ns) 344, speaker (spkr) 352, display 240, and microphone (mic) 354 can all be positioned directly on the bear's face, for example, to give the user the feeling of direct interaction with the bear. A speech recognition indicator 505 can be used to show the user whether the users speech was recognized by the device 500 for translation and should be placed in a position that is easily seen by the user. The power button 510 and start button 515 can be placed anywhere on the device, but like the other buttons and features, should be placed in a position that is easily located by the respected user.

Other state selectors can include, for example, a translation pace selector to adjust the pace of the translation from a real-time translation to a slow and more easily assimilated translation pace for ease of use by some users. The device 500 will also include a power supply. In some embodiments, the device 500 will have an internal power supply, an external power supply, or combination of an internal and external power supply. In some embodiments, the device can use batteries, and in some embodiments, the device can be recharged.

It should be appreciated that the state selectors may be in the form of dials and buttons that are easy to hold and turn by a child of preschool age or, for that matter, by any user that has difficulty with hand coordination or strength, such as an older user or a user having an adverse physiological condition whether acute or chronic. Such buttons and dials can be large and/or prominent in features, highly contrasting in color to adjacent components, and perhaps be shaped or textured for ease of gripping. Additionally, it should be appreciated that the shape and appearance of the device can be changed to meet the interest of any demographic, whether the user be young, old, teenager, average adult, man, woman, etc. As such, the systems taught herein can be designed to be appealing and useful to early childhood students, elementary age students, older language learners, travelers, business people, and families.

Figure 6:
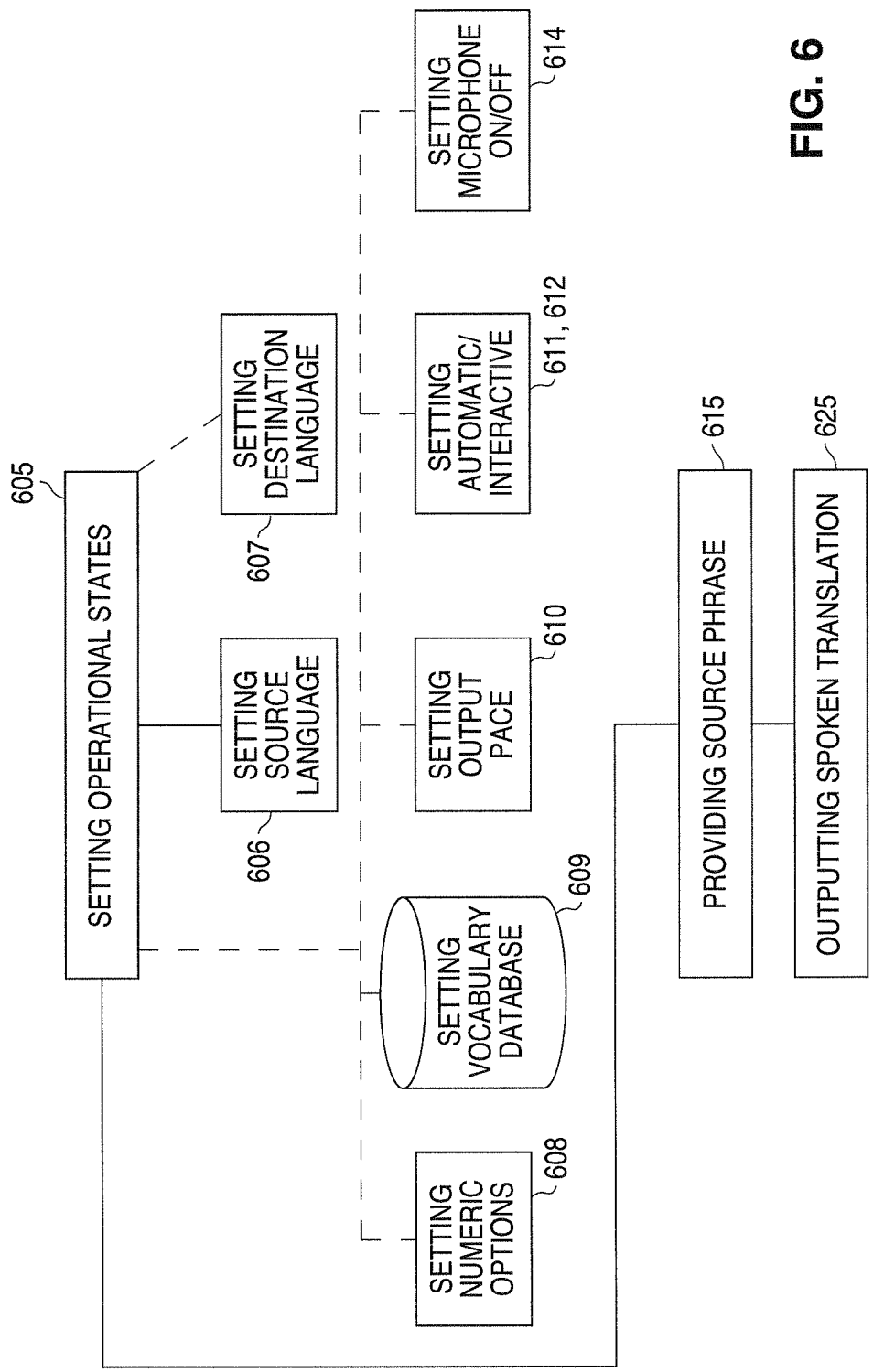
FIG. 6 is a flowchart illustrating a method of teaching numeric or language skills in multiple spoken languages using the systems taught herein according to some embodiments.

The systems taught herein provide methods of exploring language learning as well as accelerating the acquisition of second or even multiple languages. FIG. 6 is a flowchart illustrating a method of teaching numeric or language skills in multiple spoken languages using the systems taught herein according to some embodiments. The method includes setting 605 operational states of the system, wherein the setting 605 includes setting the source language 606 and the destination language 607, and optionally includes setting numeric options 608, a vocabulary database 609, an output pace 610, automatic/interactive mode 611, 612, or microphone on/off 613. The method also includes providing 615 the source phrase to the translation engine and outputting 625 the spoken translation to teach language or numeric skills in the language selected from the multiple languages by a user.

Educational systems can be mandated to follow curriculum guidelines. In the United States, for example, the No Child Left Behind Act requires states and school districts to establish particular curriculum guidelines. Nationwide in the United States, students are required to meet benchmarks for each grade level. The systems taught herein adhere to curriculum guidelines and, in some embodiments, cover numeric concepts from beginning counting to math functions such as, for example, addition, subtraction, multiplication, and division.

General vocabulary skills, for example, can also be taught, in some embodiments, using the systems described herein. Students can master these principles using the systems taught herein and then use this knowledge to master these skills in multiple languages. In some embodiments, the systems taught herein can be useful to preschool and elementary school children, particularly where the systems can be designed to adhere to curriculum guidelines. In some embodiments, the systems taught herein can be useful to high school and college students, particularly if they want to master foreign languages. In some embodiments, the systems taught herein can be useful to older persons that are either interested in acquiring new skills or want to exercise these skills.

Figure 7:
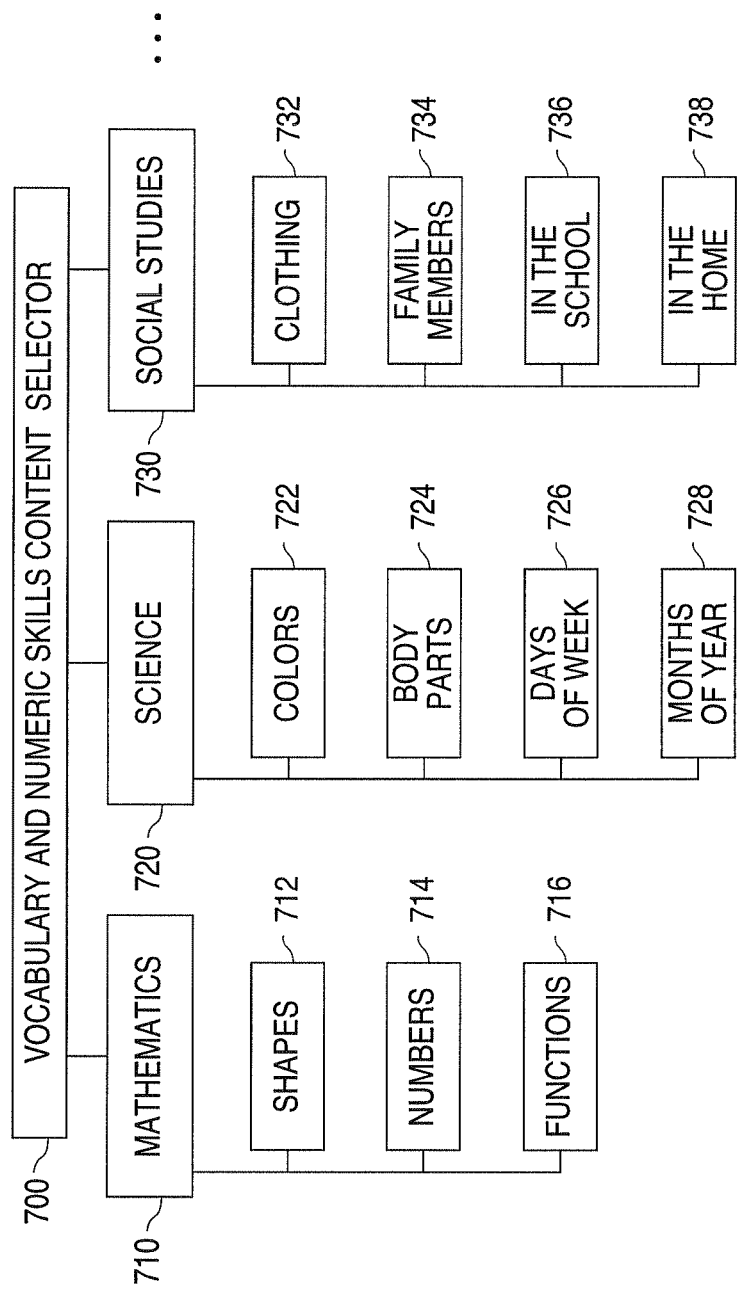
FIG. 7 is a flowchart illustrating the categories of vocabulary and numeric skills content selections in the multilanguage and numeric databases according to some embodiments.

FIG. 7 is a flowchart illustrating the categories of vocabulary and numeric skills content selections in the multilanguage and numeric databases according to some embodiments. The vocabulary and numeric skills content selector 700 is a state selector through which a user can select a set of numeric skills or language skills to learn, wherein the content may be designed to adhere to curriculum guidelines as described herein.

In some embodiments, the vocabulary and numeric skills selector 700 includes mathematics 710, science 720, and social studies 730. The mathematics skills can include shapes 712, numbers 714, and functions 716. The science skills can include colors 722, body parts 724, days of the week 726, and months of the year 728. The social studies can include clothing 732, family members 734, things in the school 736, and things in the home 738. It should be appreciated that other content areas can be included such as, for example, language arts and reading In the mathematics 710 content area, the shapes 712, for example, can include a triangle, square, circle, rectangle, star, heart, and diamond. The numbers 714, for example, can include numbers from 1-1000, 1-100, 1-50, 1-20, 1-10, and any range therein. The numbers can be designed for sequential counting or skip counting, and functions such as addition, subtraction, multiplication, and division can be performed on the numbers.

In the science 720 content area, the colors 722, for example, can include red, green, blue, yellow, brown, orange, pink, purple, black, and white. The body parts 724, for example, can include the head, eyes, nose, mouth, ears, shoulders, arms, fingers, legs, and feet. The days of the week 726 and the days of the month 728, of course, are fixed. Although alternate calendars can be contemplated for use in some embodiments.

In the social studies 730 content area, the clothing 732, for example, can include a dress, blouse, skirt, t-shirt, shoes, shirt, pants, sweater, hat, coat, purse, swimsuit, and belt. The family members 734, for example, can include father, mother, brother, sister, grandfather, grandmother, aunt, uncle, and cousin. The things in the school 736, for example, can include a classroom, cafeteria, library, office, gym, playground, nurse's office, and principal's office. The things in the home 738, for example, can include a kitchen, living room, dining room, bedroom, bathroom, garage, and yard.

It should be appreciated that the content areas listed above are for example only, and the totality of the content areas can be larger or smaller, and each of these areas can be filled with an almost endless amount of language and numeric teachings. And, for that matter, it should be appreciated that there is an almost endless variation of subcategories that can be implemented for use in the multilingual database.

Figure 8A:
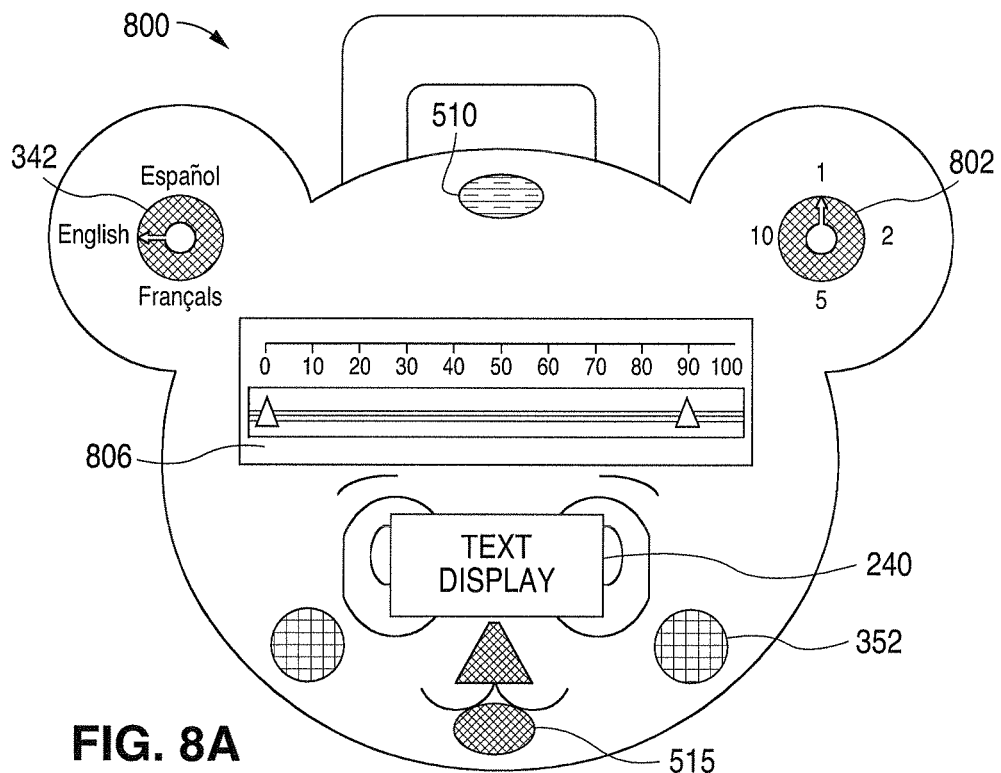
FIGS. 8a and 8b illustrate the front and back of a device for children that is designed only for sequential counting or skip counting in multiple tilanguage and numeric databases according to some embodiments.
Figure 8B:
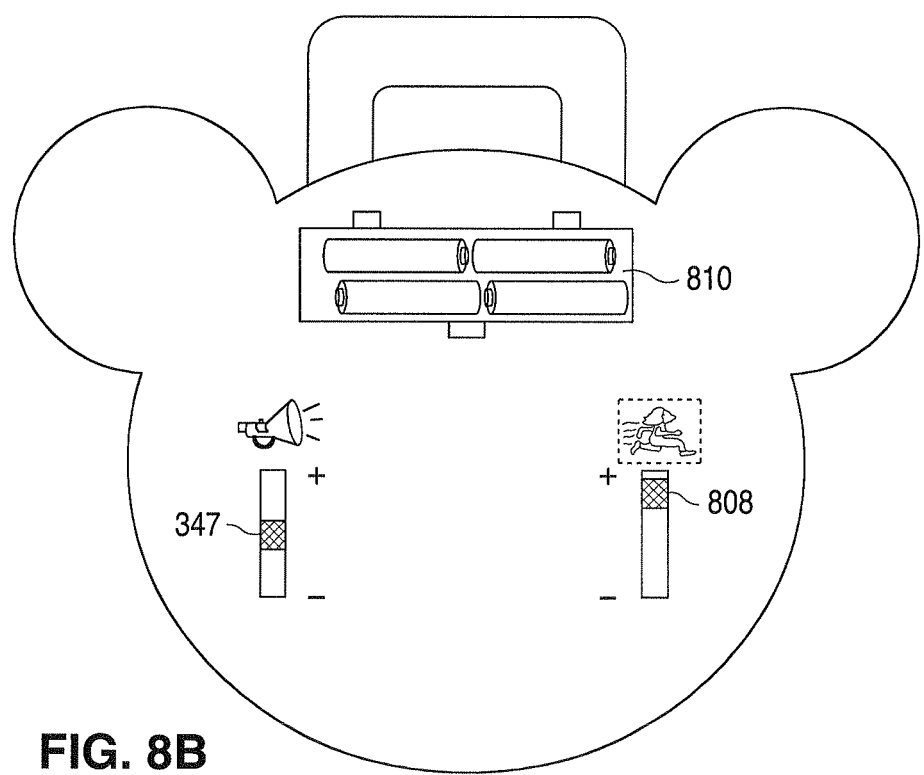

The systems taught herein can include simple embodiments with limited teachings. FIGS. 8*a* and 8*b* illustrate the front and back of a device for children that is designed only for sequential counting or skip counting in multiple languages according to some embodiments. The device 800 again has the shape of a bear, but does not accept a spoken source phrase and, thus, does not perform speech recognition or voice coding and does not need a microphone (mic) 354, the source language state selector (ss) 341, the automatic operation/interactive operation state selector (a/i) 346, speech recognition indicator 505, or the vocabulary content state selector (vc) 343.

FIG. 8*a* shows that the state selectors on the device 800 are few and simplified. The destination language state selector (ds) 342, and numeric state selector (ns) 344 are positioned on the bears left and right ears, respectively. The numeric state selector (ns) 344 is actually separated into two different selectors—a counting range selector 802 and a skip counting/counting interval selector 806. Speaker (spkr) 352, and display 240, can again all be positioned directly on the bear's face to give the user the feeling of direct interaction with the bear and engage the user in the learning process. The power button 510 and start button 515 can again be placed anywhere on the device, but like the other buttons and features, should be placed in a position that is easily located by the respected user. FIG. 8b shows the mute/volume state selector (m/v) 347 located on the back of the device next to a pace selector 808 and a battery compartment 810.

Other state selectors can include, for example, a translation pace selector to adjust the pace of the translation from a real-time translation to a slow and more easily assimilated translation pace for ease of use by some users. The device 500 will also include a power supply. In some embodiments, the device 500 will have an internal power supply, an external power supply, or combination of an internal and external power supply. In some embodiments, the device can use batteries, and in some embodiments, the device can be recharged.

EXAMPLE

The real-time translation capabilities of the systems taught herein are designed to have a performance speed that is fast enough to provide a fast and engaging real-time translation for a fully functioning system having source language input, recognition, voice coding, translation, and resynthesis. The following table provides process times for the major steps in the translation:

| System Function | Time (ms) |
| --- | --- |
| ASR (Automated Speech Recognition) of uttered source phrase into system microphone | 2 |
| Voice coding (pitch, cadence, tone extraction & buffering) from uttered source phrase | 3 |
| Translation of source phrase to destination phrase | 2 |
| Speech resynthesis (overlay of extracted pitch, cadence, tone on template destination phrase followed by spoken translation) | 3 |
| Total Translation Time | 10 |

It should be appreciated that the methods and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will be apparent to one of skill given the teachings herein. In addition, the techniques are not described with reference to any particular programming language, and various embodiments may thus be implemented using a variety of programming languages. Accordingly, the terms and examples provided above are illustrative only and not intended to be limiting; and, the term "embodiment," as used herein, means an embodiment that serves to illustrate by way of example and not limitation.

We claim:

1. A method of providing a portable, real time voice translation, the method comprising:

making a translation system available to a user for use on a single unit, portable device having a processor and a memory, the translation system having a computer program that is operable in executing the following functions:

accessing a multilanguage database embodied in a non-transitory computer readable storage medium including a plurality of phrase templates associated with a respective plurality of phrases;

selecting a source language from a plurality of source languages and a destination language from a plurality of destination languages;

inputting a source phrase;

transmitting the source phrase (i) to a speech recognition module embodied in a non-transitory computer readable storage medium for converting the spoken source phrase into a recognized source phrase; (ii) a translation engine embodied in a non-transitory computer readable storage medium for translating the recognized source phrase in the selected source language into a destination phrase in a destination language selected from multiple languages, wherein the plurality of phrases in the multilanguage database include the destination phrase; (iii) a template look-up engine embodied in a non-transitory computer readable storage medium for finding the phrase template associated with the destination phrase from among the multiple languages; and, outputting the spoken translation in the selected destination language;

the translation system having a total time between the input of the source phrase and output of the destination phrase that is no slower than 0.010 seconds.

2. The method of claim 1, wherein the executing includes transmitting the source phrase to (iv) a parameterization module embodied in a non-transitory computer readable storage medium for deriving parameters from the source phrase and applying the parameters to the phrase template associated with the destination phrase.

3. The method of claim 1, wherein the executing includes selecting an operational state selected from the group consisting of vocabulary content, source language options, destination language options, numeric skills options, translation output pace, and microphone on/off.

4. The method of claim 1, wherein the executing includes sequentially translating a series of input source phrases to provide a real-time translation in the form of a series of spoken destination phrases in the language selected from multiple languages, wherein the time between the input and output of the source phrase in the speech recognition module is no slower that about 2 milliseconds, in the voice coding module is no slower than 3 milliseconds, in the translation engine is no slower than about 2 milliseconds, and in the parameterization module is no slower than about 3 milliseconds, such that the total time between the input of the source phrase and output of the destination phrase is no slower than 0.010 second.

5. The method of claim 1, wherein the executing includes translating a source phrase to multiple destination languages in a sequential, simultaneous, or overlapping manner.

6. The method of claim 1, wherein the executing includes capturing speech parameters of the input source phrase, applying the captured speech parameters to the phrase template associated with the destination language, and using the result to mimic characteristics of the input source phrase.

7. The method of claim 6, wherein the captured speech parameters include the pitch, cadence, and tone characteristics of the input source phrase.

8. The method of claim 1, wherein the executing includes displaying a written form of the source phrase, a written form of the destination phrase, or both.

9. The method of claim 1, wherein the executing includes accessing a second computer system through a communications interface.

10. The method of claim 9, wherein the communications interface includes a satellite transmission interface.

11. The method of claim 1, wherein the choosing includes selecting the source language and the destination language from the group consisting of French, Malay-Indonesian, Japanese, Portuguese, Bengali, Arabic, Russian, Spanish, Hindustani, English, and Mandarin.

12. The method of claim 1, wherein the executing includes accessing a plurality of phrase templates that represent languages that include at least a combination of
English, French, and Spanish;
English, Japanese, and Mandarin;
English, French, and Portuguese;
English, Russian, and Mandarin;
English, Hindustani, and Japanese; or,
English, Arabic, and Russian.

13. A method of using a portable, real time voice translation, the method comprising:
obtaining a translation system for use on a single unit, portable device having a processor and a memory, the translation system having a computer program that is operable for executing the following functions:
accessing a multilanguage database embodied in a non-transitory computer readable storage medium including a plurality of phrase templates associated with a respective plurality of phrases;
selecting a source language from a plurality of source languages and a destination language from a plurality of destination languages;
inputting a source phrase;
transmitting the source phrase to (i) a speech recognition module embodied in a non-transitory computer readable storage medium for converting the spoken source phrase into a recognized source phrase; (ii) a translation engine embodied in a non-transitory computer readable storage medium for translating the recognized source phrase in the selected source language into a destination phrase in a destination language selected from multiple languages, wherein the plurality of phrases in the multilanguage database include the destination phrase; and, (iii) a template look-up engine embodied in a non-transitory computer readable storage medium for finding the phrase template associated with the destination phrase from among the multiple languages; and,
outputting the spoken translation in the selected destination language;
the translation system having a total time between the input of the source phrase and output of the destination phrase that is no slower than 0.010 seconds; and,
executing the computer program.

14. The method of claim 13, wherein the executing includes transmitting the source phrase to (iv) a parameterization module embodied in a non-transitory computer readable storage medium for deriving parameters from the source phrase and applying the parameters to the phrase template associated with the destination phrase.

15. The method of claim 13, wherein the executing includes selecting an operational state selected from the group consisting of vocabulary content, source language options, destination language options, numeric skills options, translation output pace, and microphone on/off.

16. The method of claim 13, wherein the executing includes sequentially translating a series of input source phrases to provide a real-time translation in the form of a series of spoken destination phrases in the language selected from multiple languages, wherein the time between the input and output of the source phrase in the speech recognition module is no slower that about 2 milliseconds, in the voice coding module is no slower than 3 milliseconds, in the translation engine is no slower than about 2 milliseconds, and in the parameterization module is no slower than about 3 milliseconds, such that the total time between the input of the source phrase and output of the destination phrase is no slower than 0.010 second.

17. The method of claim 13, wherein the executing includes translating a source phrase to multiple destination languages in a sequential, simultaneous, or overlapping manner.

18. The method of claim 13, wherein the executing includes capturing speech parameters of the input source phrase, applying the captured speech parameters to the phrase template associated with the destination language, and using the result to mimic characteristics of the input source phrase.

19. The method of claim 18, wherein the captured speech parameters include the pitch, cadence, and tone characteristics of the input source phrase.

20. The method of claim 13, wherein the executing includes displaying a written form of the source phrase, a written form of the destination phrase, or both.

21. The method of claim 13, wherein the executing includes accessing a second computer system through a communications interface.

22. The method of claim 21, wherein the communications interface includes a satellite transmission interface.

23. The method of claim 13, wherein the choosing includes selecting the source language and the destination language from the group consisting of French, Malay-Indonesian, Japanese, Portuguese, Bengali, Arabic, Russian, Spanish, Hindustani, English, and Mandarin.

24. The method of claim 13, wherein the executing includes accessing a plurality of phrase templates that represent languages that include at least a combination of
English, French, and Spanish;
English, Japanese, and Mandarin;
English, French, and Portuguese;
English, Russian, and Mandarin;
English, Hindustani, and Japanese; or,
English, Arabic, and Russian.

25. A portable, real time voice translation system, comprising:
a translation system for use on a single unit, portable device having a processor and a memory, the translation system having a computer program that is operable for executing the following functions:
accessing a multilanguage database embodied in a non-transitory computer readable storage medium including a plurality of phrase templates associated with a respective plurality of phrases;
selecting a source language from a plurality of source languages and a destination language from a plurality of destination languages;
inputting a source phrase;
transmitting the source phrase to (i) a speech recognition module embodied in a non-transitory computer readable storage medium for converting the spoken source phrase into a recognized source phrase; (ii) a translation engine embodied in a non-transitory computer readable storage medium for translating the recognized source phrase in the selected source language into a destination phrase in a destination language selected from multiple languages, wherein the plurality of phrases in the multilanguage database include the destination phrase; and, (iii) a template look-up engine embodied in a non-transitory computer readable storage medium for finding the phrase template associated with the destination phrase from among the multiple languages; and, outputting the spoken translation in the selected destination language;

wherein, the translation system has (i) a total time between the input of the source phrase and output of the destination phrase that is no slower than 0.010 seconds; and, (ii) a communications interface operable for communicating with a second computer system.

26. The system of claim 25, wherein the executing includes transmitting the source phrase to (iv) a parameterization module embodied in a non-transitory computer readable storage medium for deriving parameters from the source phrase and applying the parameters to the phrase template associated with the destination phrase.

27. The system of claim 25, wherein the executing includes selecting an operational state selected from the group consisting of vocabulary content, source language options, destination language options, numeric skills options, translation output pace, and microphone on/off.

28. The system of claim 25, wherein the executing includes sequentially translating a series of input source phrases to provide a real-time translation in the form of a series of spoken destination phrases in the language selected from multiple languages, wherein the time between the input and output of the source phrase in the speech recognition module is no slower that about 2 milliseconds, in the voice coding module is no slower than 3 milliseconds, in the translation engine is no slower than about 2 milliseconds, and in the parameterization module is no slower than about 3 milliseconds, such that the total time between the input of the source phrase and output of the destination phrase is no slower than 0.010 second.

29. The system of claim 25, wherein the executing includes translating a source phrase to multiple destination languages in a sequential, simultaneous, or overlapping manner.

30. The system of claim 25, wherein the executing includes capturing speech parameters of the input source phrase, applying the captured speech parameters to the phrase template associated with the destination language, and using the result to mimic characteristics of the input source phrase.

31. The system of claim 25, wherein the captured speech parameters include the pitch, cadence, and tone characteristics of the input source phrase.

32. The system of claim 25, wherein the executing includes displaying a written form of the source phrase, a written form of the destination phrase, or both.

33. The system of claim 25, wherein the communications interface includes a satellite transmission interface.

34. The system of claim 25, wherein the choosing includes selecting the source language and the destination language from the group consisting of French, Malay-Indonesian, Japanese, Portuguese, Bengali, Arabic, Russian, Spanish, Hindustani, English, and Mandarin.

35. The system of claim 25, wherein the executing includes accessing a plurality of phrase templates that represent languages that include at least a combination of English, French, and Spanish;
English, Japanese, and Mandarin;
English, French, and Portuguese;
English, Russian, and Mandarin;
English, Hindustani, and Japanese; or,
English, Arabic, and Russian.

* * * * *